United States Patent
Hyun et al.

(10) Patent No.: US 10,225,339 B2
(45) Date of Patent: Mar. 5, 2019

(54) PEER-TO-PEER (P2P) NETWORK MANAGEMENT SYSTEM AND METHOD OF OPERATING THE P2P NETWORK MANAGEMENT SYSTEM

(71) Applicant: Electronics and Telecommunications Research Institute, Daejeon (KR)

(72) Inventors: Wook Hyun, Daejeon (KR); Chang Kyu Lee, Daejeon (KR); Sung Hei Kim, Daejeon (KR); Ju Young Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 15/246,787

(22) Filed: Aug. 25, 2016

(65) Prior Publication Data

US 2017/0063981 A1    Mar. 2, 2017

(30) Foreign Application Priority Data

Aug. 28, 2015   (KR) .................. 10-2015-0121998

(51) Int. Cl.
G06F 15/16      (2006.01)
H04L 29/08      (2006.01)
H04L 12/24      (2006.01)
H04L 12/26      (2006.01)

(52) U.S. Cl.
CPC .......... H04L 67/1042 (2013.01); H04L 41/12 (2013.01); H04L 43/16 (2013.01)

(58) Field of Classification Search
USPC ........................................... 709/219
See application file for complete search history.

(56) References Cited

U.S. PATENT DOCUMENTS

| | | | | |
|---|---|---|---|---|
| 7,379,967 | B2* | 5/2008 | Izutsu ................... | H04L 67/104 709/204 |
| 7,716,660 | B2* | 5/2010 | Mackay .................. | G06F 8/658 717/173 |
| 8,010,748 | B2* | 8/2011 | Twiss ................... | H04L 12/1886 709/217 |
| 8,051,205 | B2* | 11/2011 | Roy ................... | G06F 17/30206 709/244 |
| 8,131,673 | B2* | 3/2012 | Chavez ................. | H04L 67/104 707/622 |
| 8,924,460 | B2* | 12/2014 | Collet ................... | H04L 67/104 709/202 |
| 9,258,361 | B2* | 2/2016 | Ansari .................. | H04L 67/104 |

(Continued)

*Primary Examiner* — Alicia Baturay
(74) *Attorney, Agent, or Firm* — Kile Park Reed & Houtteman PLLC

(57) ABSTRACT

Disclosed is a method of operating a peer-to-peer (P2P) network management system, the method including generating a peer list in response to a request for the peer list from a request peer and sending a request for piece information corresponding to the peer list to a peer activity management server, the peer activity management server being configured to manage peer status information, receiving the piece information generated based on the peer status information from the peer operation server, generating a response message including the piece information and the peer list, and sending the response message to the request peer.

4 Claims, 8 Drawing Sheets

(56) References Cited

U.S. PATENT DOCUMENTS

| | | |
|---|---|---|
| 2008/0133698 A1 | 6/2008 | Chavez et al. |
| 2009/0100128 A1* | 4/2009 | Czechowski, III ... H04L 67/104 709/203 |
| 2010/0169277 A1 | 7/2010 | Shyu et al. |
| 2011/0208828 A1* | 8/2011 | Sakakihara ....... G06F 17/30545 709/217 |
| 2011/0225312 A1 | 9/2011 | Liu et al. |
| 2014/0019543 A1 | 1/2014 | Hyun et al. |
| 2015/0023342 A1 | 1/2015 | Joo |

* cited by examiner

PEER-TO-PEER (P2P) NETWORK MANAGEMENT SYSTEM AND METHOD OF OPERATING THE P2P NETWORK MANAGEMENT SYSTEM

CROSS-REFERENCE TO RELATED APPLICATION(S)

This application claims the priority benefit of Korean Patent Application No. 10-2015-0121998 filed on Aug. 28, 2015, in the Korean Intellectual Property Office, the disclosure of which is incorporated herein by reference for all purposes.

BACKGROUND

1. Field

One or more example embodiments relate to a peer-to-peer (P2P) network management system and a method of operating the P2P network management system.

2. Description of Related Art

A peer-to-peer (P2P) network may be a distributed network in which a peer is connected to another peer to transmit and receive contents to and from the other peer in lieu of a server. In such network, the peer may function as a client receiving the contents and also function as a server providing the contents. Also, the P2P network may be formed based on contents to be shared in lieu of a predetermined server. For this reason, a connection between peers and a size of network may vary in the P2P network.

SUMMARY

According to an aspect, there is provided a method of operating a peer-to-peer (P2P) network management system, the method including generating a peer list in response to a request for the peer list from a request peer and sending a request for piece information corresponding to the peer list to a peer activity management server, the peer activity management server being configured to manage peer status information, receiving the piece information generated based on the peer status information from the peer operation server, generating a response message including the piece information and the peer list, and sending the response message to the request peer, wherein the piece information included in the response message includes at least one of a piece list including a number of pieces, a size of a piece, and identification information of the piece, and a piece range including identification information of a start piece and identification information of an end piece.

The generating of the peer list may include sending a request for a rarest piece to the peer activity management server in response to the request from the request peer.

The receiving of the piece information from the peer activity management server may include receiving information on the rarest piece acquired based on a piece distribution status.

The peer activity management server may be configured to acquire the piece distribution status based on the peer status information.

The peer activity management server may be configured to determine a piece corresponding to a piece distribution status lower than or equal to a threshold level to be the rarest piece.

The threshold level may be determined based on an average value of a number of pieces belonging to a peer included in the peer list or a ratio of each piece belonging to the peer included in the peer list to all pieces of the peer.

The request peer may be configured to access a peer included in the peer list using the response message and requesting the rarest piece by priority when the peer has the rarest piece.

The method may further include querying a user management server to obtain class information of a user in response to the request for the peer list from the request peer, the user management server being configured to manage information associated with the user corresponding to the request peer, and receiving the class information from the user management server and transmitting the class information to the peer activity management server.

The peer operation management server may be configured to generate the piece information to correspond to the class information.

The method may further include transmitting the peer list to the peer activity management server, wherein the peer activity management server may be configured to verify a piece distribution status of a piece belonging to at least one peer included in the peer list and generate the piece information based on the piece distribution status.

According to another aspect, there is also provided a P2P network management system including a network manager configured to manage an overlay network in which a plurality of peers participates, and a peer activity manager configured to manage peer status information of the plurality of peers, wherein the network manager is configured to generate a peer list in response to a request for the peer list from a request peer and send a request for piece information corresponding to the peer list to a peer activity management server, receive the piece information generated based on the peer status information from the peer operation server, generate a response message including the piece information and the peer list, and transmit the response message to the request peer, and the piece information included in the response message includes at least one of a piece list including a number of pieces, a size of a piece, and identification information of the piece, and a piece range including identification information of a start piece and identification information of an end piece.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
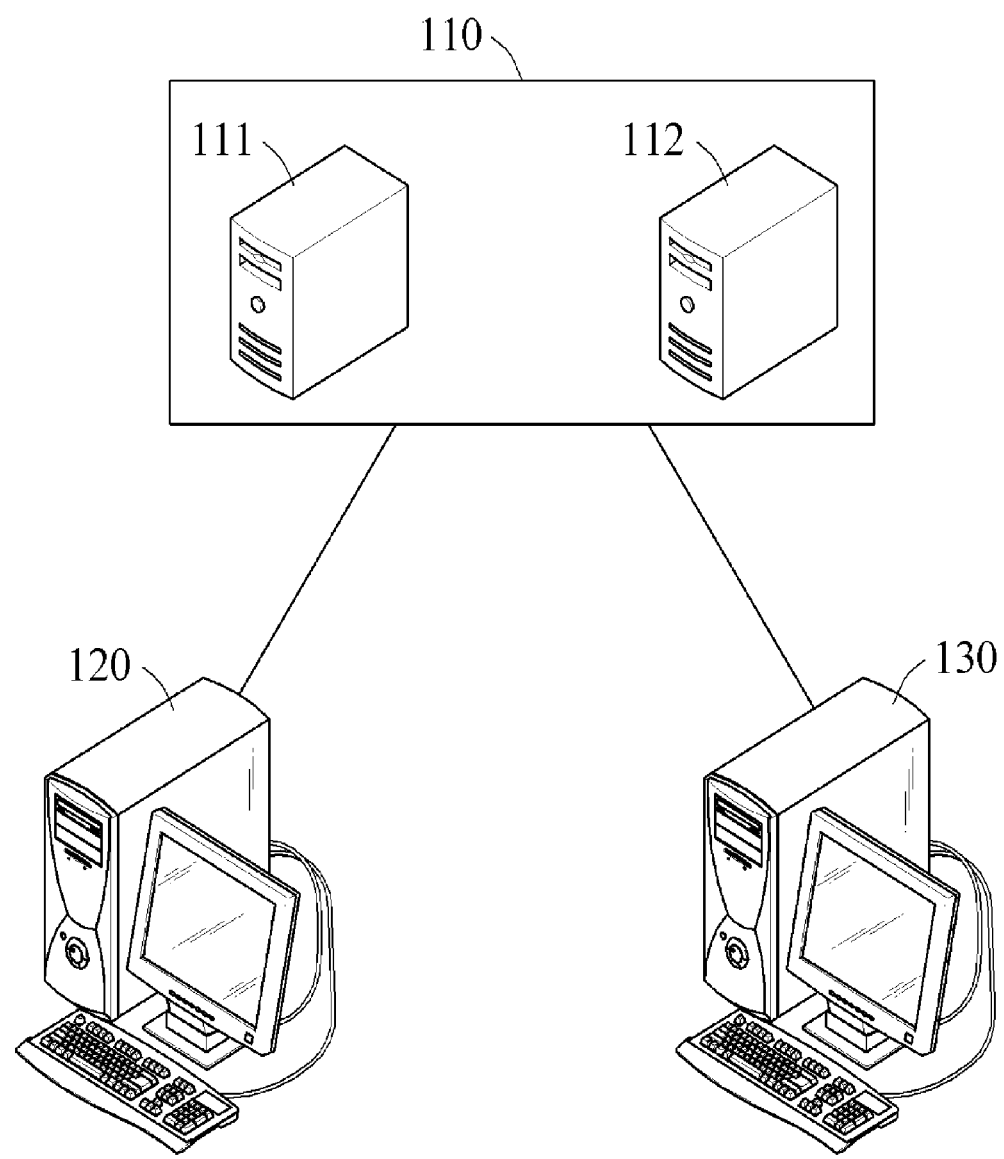
FIG. 1 is a diagram illustrating a peer-to-peer (P2P) network management system according to an example embodiment.

Hereinafter, some example embodiments will be described in detail with reference to the accompanying drawings.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a peer-to-peer (P2P) network management system according to an example embodiment.

Referring to FIG. 1, a P2P network management system may include a server 110 and a plurality of peers 120 and 130.

The server 110 may include an overlay management server (OMS) 111 and a peer activity management server (PAMS) 112.

The OMS 111 may manage information on a P2P network and provide the information to the plurality of peers 120 and 130 such that the plurality of peers 120 and 130 configures the P2P network. Also, the OMS 111 may manage resources in an overlay network in which the plurality of peers 120 and 130 participates.

The PAMS 112 may manage information on the plurality of peers 120 and 130. For example, the PAMS 112 may collect or manage status information of the plurality of peers 120 and 130. The status information may include static information and dynamic information. The static information may be information associated with a configuration of the P2P network and a service policy of the P2P network. The dynamic information may be information associated with activities of the plurality of peers 120 and 130. The plurality of peers 120 and 130 may report the dynamic information to the PAMS 112 at an interval of a report period. For example, each of the plurality of peers 120 and 130 may report an amount of data received from another peer, an amount of data transmitted to the other peer, and a data transmission and reception history to the PAMS 112.

The static information of the peer may be shown in Table 1, and the dynamic information of the peer may be shown in Table 2.

TABLE 1

| Type | Element | Meaning |
| --- | --- | --- |
| Static information | Maximum download BW | Maximum global download bandwidth of peer |
| Static information | Maximum download BW per overlay network | Maximum download bandwidth per overlay network of peer |
| Static information | Maximum upload BW | Maximum global upload bandwidth of peer |
| Static information | Maximum upload BW per overlay network | Maximum upload bandwidth per overlay network of peer |
| Static information | Maximum number of connections for upload per overlay network | Maximum number of connections for upload per overlay network of peer |

TABLE 2

| Type | Element | Meaning |
| --- | --- | --- |
| Dynamic information | OVERLAY_ID | ID of overlay network in which peer participates |
| Dynamic information | OverlayEvent | Overlay network participation state |
| Dynamic information | Downloaded | Total amount of data downloaded by peer participating in overlay network after peer starts operation (in unit of kilobytes (KB)) |
| Dynamic information | Uploaded | Total amount of data uploaded by peer participating in overlay network after peer starts operation (in unit of KB) |
| Dynamic information | Left | Amount of data to be additionally downloaded to complete download (in unit of KB) |
| Dynamic information | Connections_for_up | Number of connections currently maintained for upload |
| Dynamic information | Connections_for_dn | Number of connections currently maintained for download |
| Dynamic information | Piece-event | Transmission and reception result of unit piece |

Piece-event of the dynamic information may indicate a result of transmitting and receiving a piece in the peer. Piece-event may also indicate information on the piece transmitted or received by the peer. For example, Piece-event may be classified into transmission information and reception information. The transmission information may include identification information of a piece transmitted by the peer, identification information of a counterpart peer, for example, identification information of another peer receiving the piece transmitted from the peer, and type information indicating that the piece is to be transmitted. The reception information may include identification information of a piece received by the peer, identification information of a counterpart peer, for example, identification information of another peer transmitting the piece received by the peer, information on an integrity of the piece, and type information indicating that the piece is to be received. The transmission information and the reception information included in Piece-event may be represented by Table 3 as below.

TABLE 3

| Type | Element | Meaning |
|---|---|---|
| Transmission information | "Piece-event-type":"Uploaded" | Transmitting of piece |
| | "Piece-id":"Piece ID" | ID of transmitted piece |
| | "To":"Opponent peer ID" | Receiving peer ID |
| Reception information | "Piece-event-type":"Downloaded" | Receiving of piece |
| | "Piece-id":"Piece ID" | ID of received piece |
| | "Piece-integrity":{True|False} | Whether piece has integrity |
| | "From":"Opponent peer ID" | Transmitting peer ID |

Piece-event-type may indicate a type of information. When a peer receives a request for a piece from another peer and transmits the piece to the other peer, the peer may set Piece-event-type to be Uploaded, set Piece-id to be identification of the transmitted piece, and set To to be identification information of the other peer. The peer may report Piece-event to the PAMS 112. When the peer receives the piece from the other peer, the peer may set Piece-event-type to be Downloaded, set Piece-id to be identification information of the received piece, set Piece-integrity to be True, and set From to be the identification information of the other peer. The peer may report Piece-event to the PAMS 112.

The PAMS 112 may receive a report about Piece-event from the peer and thus, the PAMS 112 may verify a piece that belongs to the peer. The PAMS 112 may receive a report about transmission information and/or reception information of the peer and thus, may verify a piece belonging to the peer based on the transmission information and/or the reception information. For example, when the peer receives a request for a piece a from the other peer and transmits the piece a to the other peer, the peer may report the transmission information to the PAMS 112. Through this, the PAMS 112 may verify that the peer has the piece a. When the peer does not receive the request for the piece a from the other peer, the peer may not transmit the piece a to the other peer. Thus, the peer may not report the transmission information of the piece a to the PAMS 112. The piece a belonging to the peer may be a previously received piece, and the reception information on the piece a may be reported to the PAMS 112 in a previous report period. The PAMS 112 may verify that the peer has the piece a based on the reception information reported previously.

The PAMS 112 may analyze the status information of the plurality of peers 120 and 130 and provide an analysis result to the OMS 111.

The OMS 111 may update status information of an overlay network managed by the OMS 111 to maintain a status of the overlay network to be up-to-date. Specifically, the OMS 111 may send a request for the status information of the plurality of peers 120 and 130 participating in the overlay network to the PAMS 112. The PAMS 112 may respond to the request for the status information based on information included in the PAMS 112.

As illustrated in FIG. 1, the OMS 111 and the PAMS 112 may be a device physically differing from the server 110. Also, based on an implementation, the OMS 111 and the PAMS 112 may be logically divided in a single physical device.

Figure 2:
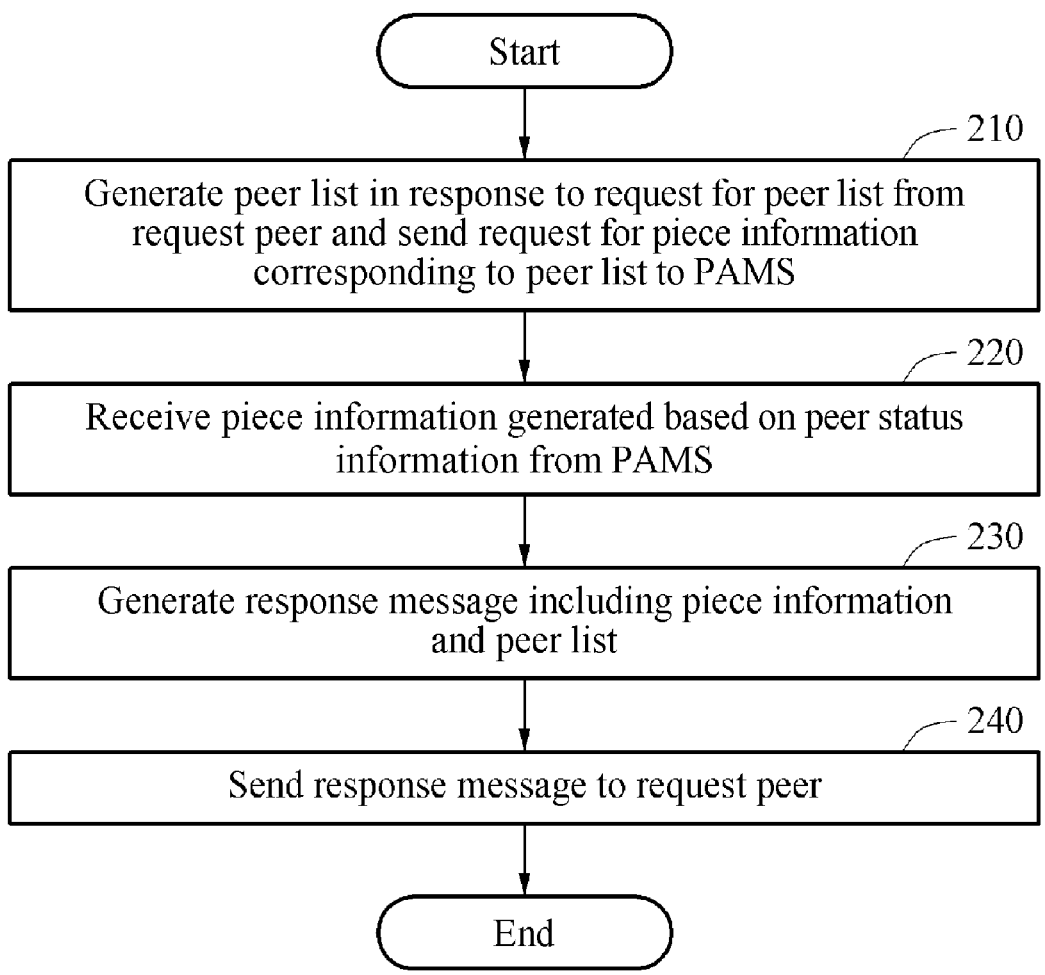
FIG. 2 is a flowchart illustrating a method of operation a P2P network management system according to an example embodiment.

FIG. 2 is a flowchart illustrating a method of operation of a P2P network management system according to an example embodiment.

Referring to FIG. 2, in operation 210, an OMS may generate a peer list in response to a request for the peer list from a request peer and send a request for piece information corresponding to the peer list to a PAMS. For example, when a request peer newly participates in an overlay network, the peer list may be requested to the OMS. In response to the request for the peer list, the OMS may generate a peer list including at least one peer among a plurality of peers included in the overlay network. When the peer list is generated, the OMS may send a request for piece information corresponding to the peer list to the PAMS.

According to an example embodiment, the OMS may send a request for information on a rarest piece to the PAMS in response to the request for the peer list. Specifically, the OMS may request information on a least distributed rarest piece among pieces belonging to at least one peer included in the peer list. As discussed above, the PAMS may manage the peer status information. The PAMS may verify the pieces belonging to the at least one peer included in the peer list based on the peer status information. Through this, the PAMS may verify a piece distribution status. The PAMS may identify the rarest piece based on the piece distribution status. For example, the PAMS may determine a piece in a piece distribution status lower than a threshold level to be the rarest piece. Here, the threshold level may be determined based on an average value of a number of pieces belonging to the at least one peer included in the peer list. Also, the threshold level may be determined based on a ratio each piece of a peer included in the peer list to all pieces belonging to the peer.

In operation 220, the OMS may receive the piece information generated based on the peer status information from the PAMS. For example, the PAMS may generate piece information including information on the rarest piece and transmit the piece information to the OMS.

In operation 230, the OMS may generate a response message including the piece information and the peer list. In operation 240, the OMS may send the response message to the request peer.

The response message may be represented by, for example, Table 4 as below.

TABLE 4

```
{
    "version":integer,
    "peerlist" : [{
        "peer" : {
            "peer-id":string,
            "network" : {
                "ip-address":string,
                "port":integer,
                "public":boolean, // yes, no
            }
        }
    }],
    "piece-list" : {
        "num-of-piece": integer,
        "piece-size": integer,
        "pieces" : [integer]
    }
    "piece-range" : {
            "start-piece-id": integer,
            "end-piece-id": integer
        }
    }
}
```

The piece information may include a piece list and/or a piece range. The piece list may include, for example, the number of pieces, a size of piece, and/or identification information of a piece. The piece range may include, for example, identification information of a start piece and identification information of an end piece. The information on the rarest piece may be embedded in the piece list and the piece range.

The request peer may receive the response message and access the peer included in the peer list. When the peer has the rarest piece, the request peer may request the rarest piece by priority.

According to an example embodiment, in response to the request for the peer list, the OMS may query class information or level information of a user to a user management server (UMS). Here, the UMS may manage information associated with the user corresponding to the request peer. The OMS may receive the class information from the UMS and transmit the class information to the PAMS. The PAMS may generate the piece information to correspond to the class information. Specifically, the PAMS may generate piece information including the piece list and/or the piece range appropriate for the class information. Here, the PAMS may receive the peer list generated by the OMS from the OMS. As discussed above, the PAMS may verify a piece distribution status. The PAMS may verify a piece distribution status of the piece belonging to at least one peer included in the peer list and generate the piece information based on the piece distribution information. Also, the PAMS may align the peer list based on a peer alignment reference. For example, the PAMS may align the peer list based on dynamic information, for example, Downloaded, Uploaded, and Left of the peer. The PAMS may transmit the piece information and the aligned peer list to the OMS. The OMS may send a response message including the piece information and the aligned peer list to the request peer.

<Providing of Information on Rarest Piece>

Figure 3:
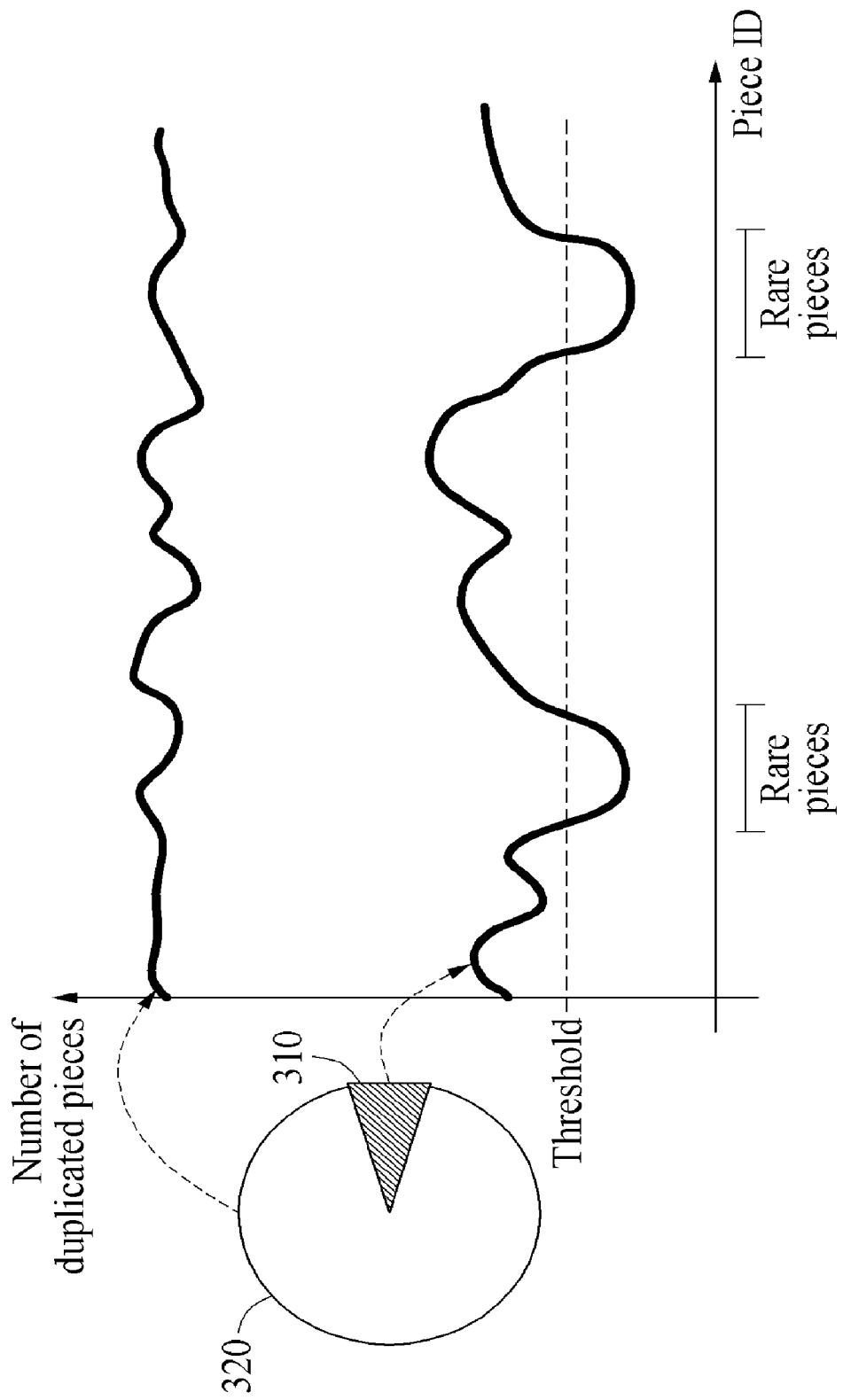
FIG. 3 illustrates an example of a rarest piece according to an example embodiment.

FIG. 3 illustrates an example of a rarest piece according to an example embodiment.

Referring to FIG. 3, a graph represents a piece distribution in an overlay network. A plurality of peers participating in the overlay network may each randomly collect a piece from another peer. In this example, a piece distribution may not be equally performed in the overlay network and thus, a rare piece may occur. In a general P2P network management system, a peer may continuously perform buffermap negotiation on other peers until the rare is found. When pieces are sufficiently distributed in the overlay network, resources may be wasted in meaningless buffermap negotiation. For example, it is likely that the rare piece is not to be found despite the buffermap negotiation being performed on numerous peer lists. By reducing such random buffermap negotiation, a download completion time may be advanced.

In the P2P network management system according to an example embodiment, an OMS may generate a peer list including at least one peer 310 among a plurality of peers 320 in response to a request for the peer list from a request peer and send a request for piece information corresponding to the peer list to a PAMS. The PAMS may verify a piece belonging to the at least one peer 310 included in the peer list based on information, for example, peer status information collected from the plurality of peers 320. For example, the PAMS may verify a piece belonging to a peer included in a predetermined subset selected by the OMS. Through this, the PAMS may verify a rarest piece which is a least distributed pieces among pieces of peers included in the peer list.

The rarest piece may be a piece of which a piece distribution status is lower than a threshold level. The threshold level may be determined based on an average value of a number of pieces belonging to the peer included in the peer list. For example, the peer list may include two peers each including pieces a, b, and c and one peer including the pieces a and b. The number of pieces per peer, for example, the average value may be less than three. In this example, three pieces a and three pieces b may be distributed to the peers and thus, the number of pieces a and the number of pieces b may be greater than the average value. Also, two pieces c may be distributed to the peers and thus, the number of pieces c may be less than the average value. The PAMS may determine the piece c to be the rarest piece. Also, the threshold level may be determined based on a ratio of each piece belonging to the peer included in the peer list to all pieces belonging to the peer included in the peer list. In the foregoing example, the number of pieces belonging to the three peers may be eight. Here, since three pieces a and three pieces b are distributed, each of the pieces a and b may have a distribution ratio of 3/8. Also, since two pieces c are distributed, the piece c may have a distribution ratio of 2/8. The threshold level may be determined to be the lowest distribution ratio. Since the piece c has the lowest distribution ratio, the piece c may be determined to be the rarest piece.

According to an example embodiment, the P2P network management system may enable the rarest piece to be quickly distributed and provide increased distribution performance. Hereinafter, an example of a rarest piece distribution will be described with reference to FIG. 4.

Figure 4:
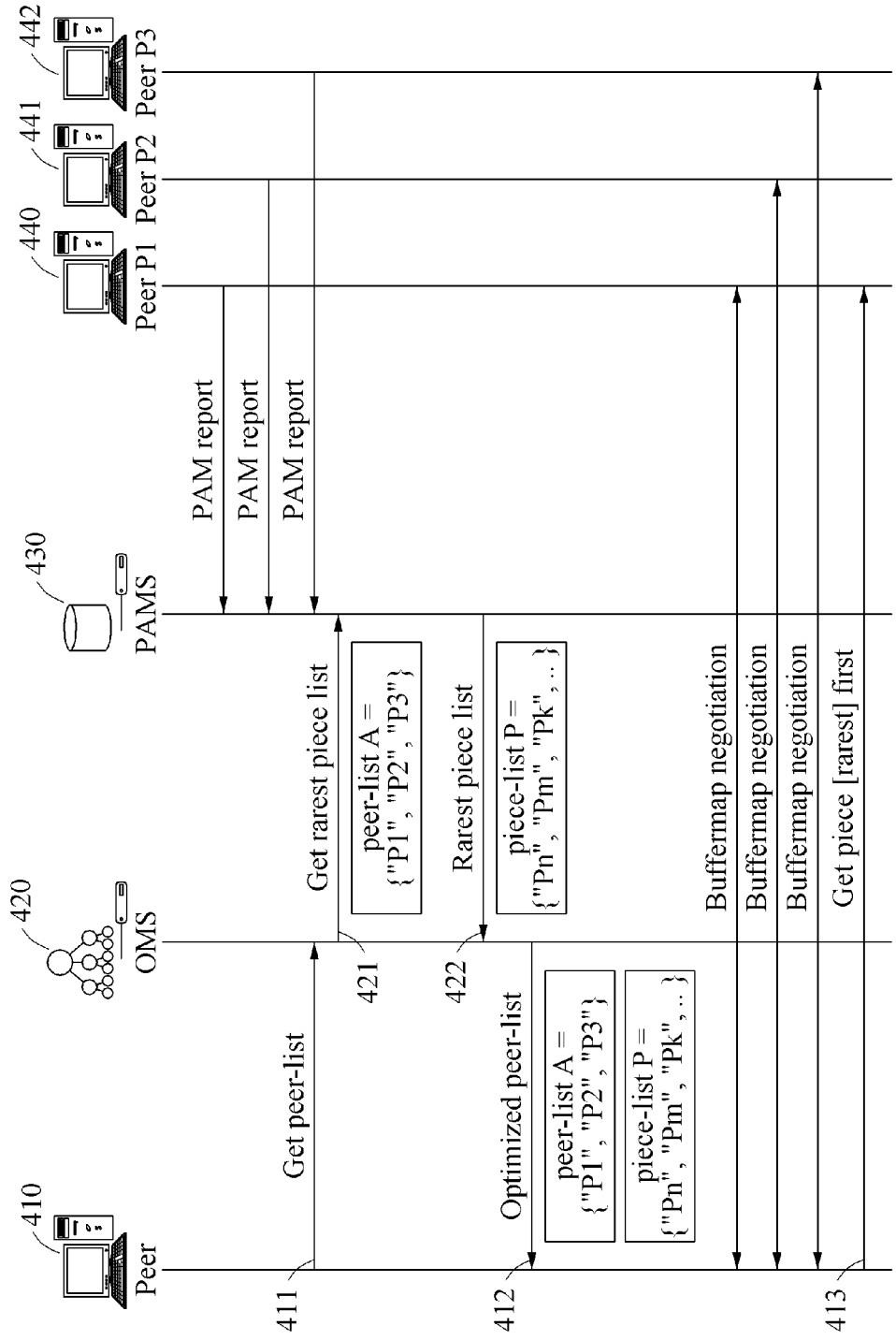
FIG. 4 illustrates an example of a method of operation a P2P network management system according to an example embodiment.

FIG. 4 illustrates an example of a method of operation a P2P network management system according to an example embodiment.

Referring to FIG. 4, a P2P network management system may include a request peer 410, an OMS 420, a PAMS 430, and a plurality of peers 440, 441, and 442.

The request peer 410 may send a request for a peer list to the OMS 420 in operation 411. According to an example embodiment, when the request peer 410 newly participates in an overlay network, the peer list may be requested to the OMS 420.

In response to the request for the peer list, the OMS 420 may generate the peer list. Also, the OMS 420 may send a request for information on a rarest piece to the PAMS 430 in operation 421. Hereinafter, the information on a rarest piece may also be referred to as, for example, rarest piece information.

The PAMS 430 may generate the rarest piece information based on status information reported by the plurality of peers 440, 441, and 442. The OMS 420 may transmit the peer list or a subset of the peer list to the PAMS 430. The PAMS 430 may verify the rarest piece of the peer list or the subset of the peer list. In this example, the OMS 420 may update the peer list or the subset of the peer list based on a peer activity status. The OMS 420 may receive the rarest piece information from the PAMS 430.

The OMS 420 may generate a response message including the rarest piece information and the peer list and send the response message to the request peer 410 in operation 412. The OMS 420 may optimize the peer list in conjunction with the PAMS 430. For example, an optimal peer list obtained by aligning the peer list based on a peer alignment reference may be transmitted to the request peer 410.

The request peer 410 may perform buffermap negotiation on each of the plurality of peers 440, 441, and 442. When the peer 440 has the rarest piece, the request peer 410 may request the peer 440 to transmit the rarest piece by priority in comparison to to other pieces in operation 413.

According to an example embodiment, pieces to be distributed by priority may be designated by the OMS 420, and the designated pieces may be distributed by priority. The PAMS 430 may generate information on the pieces designated by the OMS 420 and transmit the information to the OMS 420. The OMS 420 may transmit the information on the designated pieces to the request peer 410. When a peer accessed by the request peer 410 has a designated piece, the request peer 410 may request the designated piece by priority. Through this, the designated pieces may be distributed by priority. Since files of urgent distribution are to be distributed by priority, the P2P network management system may be applicable to, for example, an emergency alarm, an emergency message, and an emergency patch.

<Providing of Live Streaming Service>

Figure 5A:
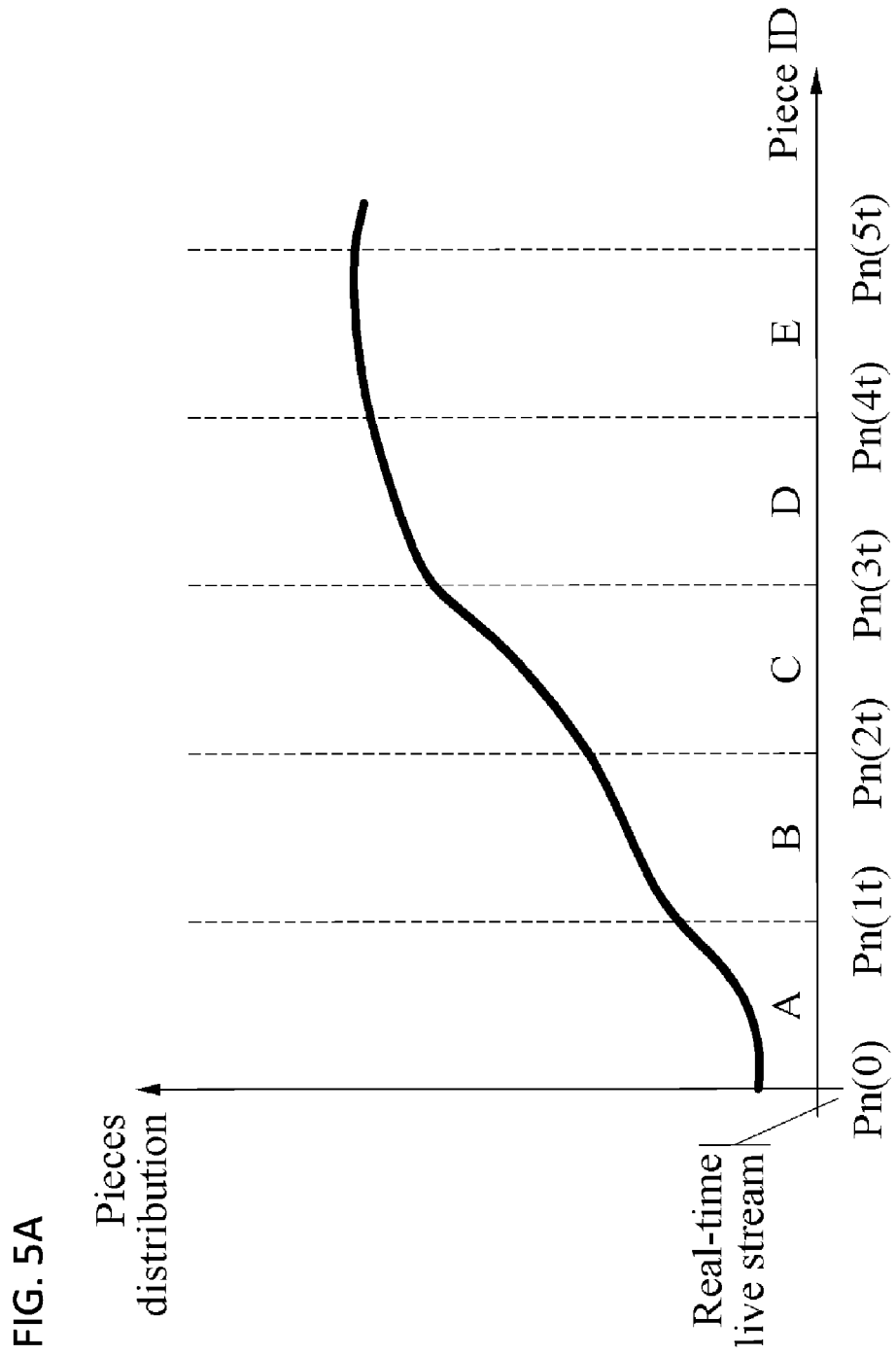
FIGS. 5A and 5B are graphs illustrating examples of piece distribution according to an example embodiment.
Figure 5B:
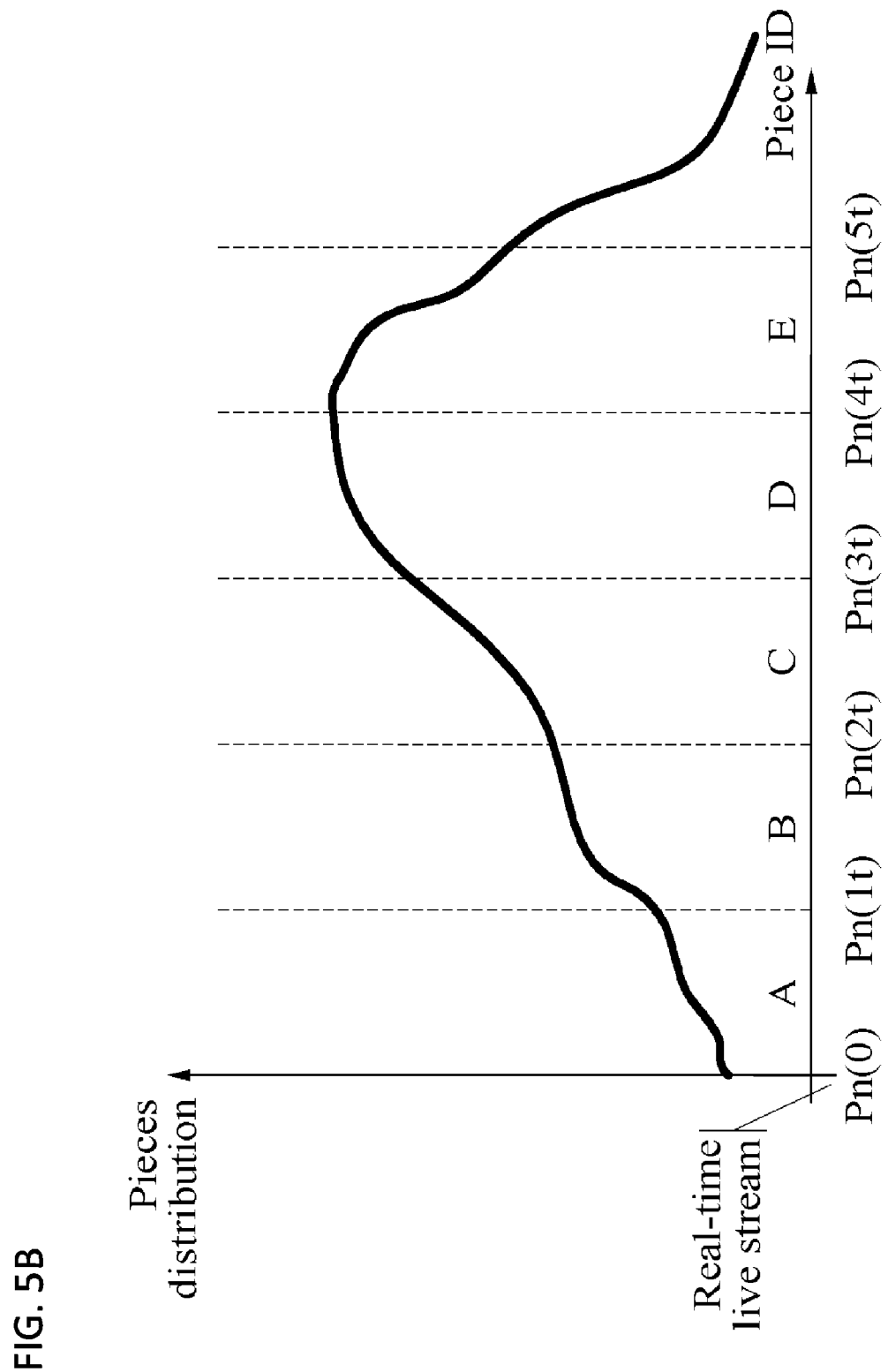

FIGS. 5A and 5B are graphs illustrating examples of piece distribution according to an example embodiment.

In terms of live streaming service, outdated data may be meaningless. Thus, a sharing section may be adjusted using a scheme such as a sliding window. FIG. 5A illustrates an example of piece distribution in an accumulative P2P streaming to which the sliding windows is not applied. FIG. 5B illustrates an example of piece distribution performed based on the sliding windows.

In a mesh-based live streaming service, peers may request latest data in general. In contrast to a file distribution, a number of sources may be restricted and some peers may be restricted on a number of connections in the live streaming service. Due to this, when all peers wait for the latest piece, a starvation in which a portion of peers receive the latest piece and other peers are in a wait state may occur.

An OMS may provide a peer list and piece information including a piece to be received by priority to the peers. Through this, the OMS may distribute and allocate the peers for each time zone. To distribute and allocate the peers for each time zone, the P2P network management system may use class information or level information of a user. Also, the P2P network management system may provide a differentiated live streaming service based on the class information of the user. Hereinafter, an example of providing the live streaming service will be described with reference to FIG. 6.

Figure 6:
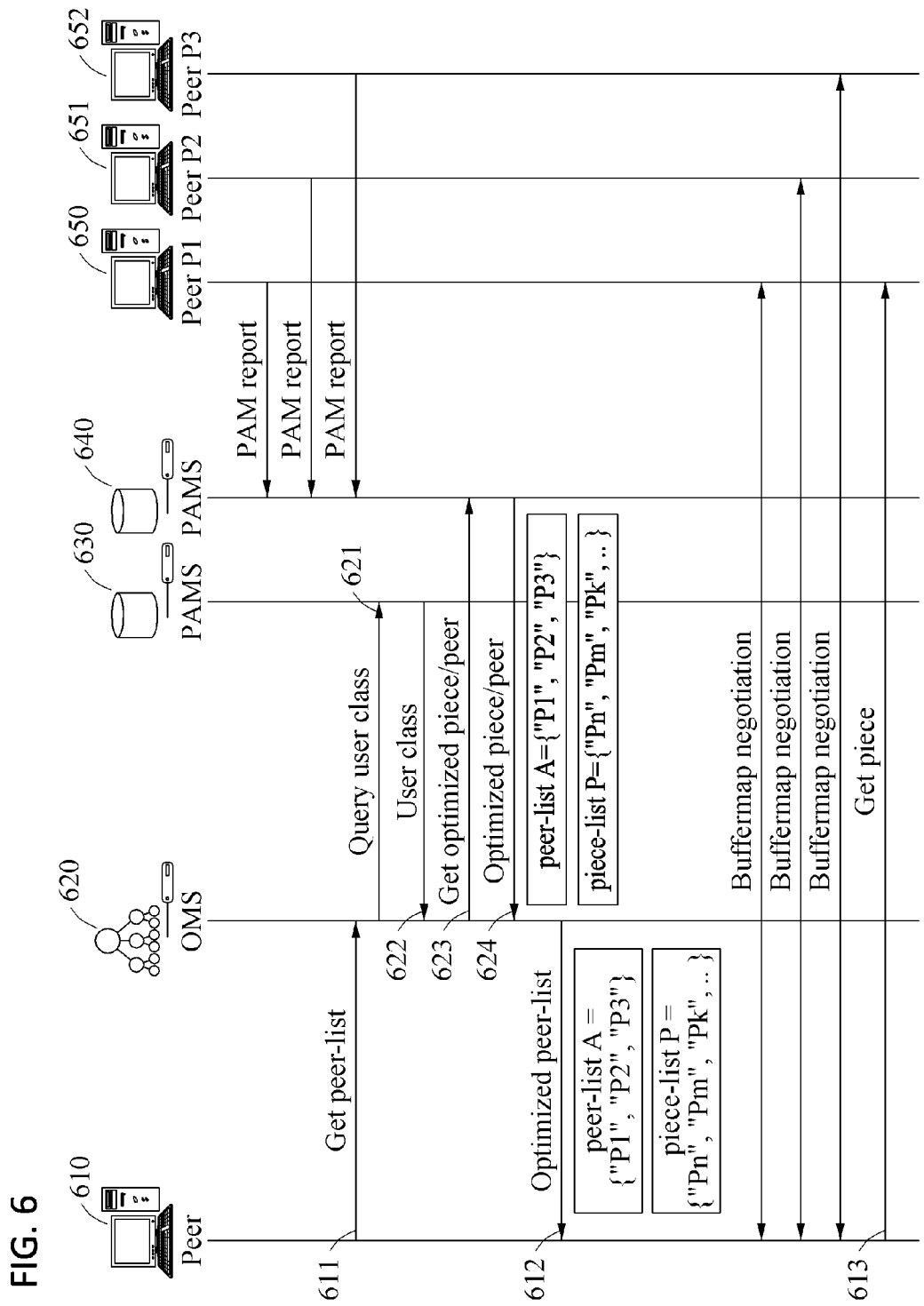
FIG. 6 illustrates another example of a method of operation a P2P network management system according to an example embodiment.

FIG. 6 illustrates another example of a method of operation a P2P network management system according to an example embodiment.

Referring to FIG. 6, a P2P network management system may include a request peer 610, an OMS 620, a UMS 630, a PAMS 640, and a plurality of peers 650, 651, and 652.

The request peer 610 may send a request for a peer list to the OMS 620 for a live streaming service in operation 611. The OMS 620 may generate the peer list.

The OMS 620 may query class information of a user corresponding to the request peer 610 to the UMS 630 in operation 621.

The UMS 630 may retrieve the class information of the user based on user identification information mapped to identification information of the request peer 610 and provide the class information to the OMS 620 in operation 622.

The OMS 620 may provide the class information to the PAMS 640. Also, the OMS 620 may send a request for piece information corresponding to the peer list to the PAMS 640 in operation 623. Here, the PAMS 640 may be aware of characteristics of an overlay network. For example, the PAMS 640 may be aware of whether the overlay network is used for file sharing or the live streaming service. This is because the PAMS 640 verifies the characteristics of the overlay network in a process in which the OMS 620 registers the overlay network on the PAMS 640. Also, the OMS 620 may provide a peer list that is not aligned to the PAMS 640.

The PAMS 640 may generate piece information to be appropriate for the class information. As discussed above, the piece information may include a piece list including the number of pieces, a size of piece, and identification information of a piece, and/or a piece range including identification information of a start piece and identification information of an end piece. When the class information is relatively high, the PAMS 640 may generate the piece information such that information on a latest piece is included in the piece information. Thus, when the class information is relatively high, the peer may receive the latest piece.

The PAMS 640 may calculate a piece distribution status of a piece belonging to a peer included in the peer list provided from the OMS 620 and determine the piece list and/or the piece range based on the piece distribution information. Also, the PAMS 640 may align the peer list based on a peer alignment reference.

The PAMS 640 may provide the aligned peer list and the piece information to the OMS 620 in operation 624. To generate optimal peer information for a P2P-based live streaming service, the class information of the user, the piece distribution status, the peer list received from the OMS, and a content type, for example, a file or a stream may be used. Also, the PAMS 640 may acquire an ordinal number of the latest piece and transfer piece numbers corresponding to numerals autonomously calculated based on a latest piece number. For example, the PAMS 640 may determine the appropriate number of pieces based on a speed of generating a piece and the latest piece number.

The OMS 620 may generate a response message including the aligned peer list and the piece information and send the response message to the request peer in operation 612.

The request peer 610 may perform a buffermap negotiation on each of the plurality of peers 650, 651, and 652. When the peer 650 has a piece required for the request peer 610, the request peer 610 may send a request for the piece to the peer 650 in operation 613.

The request peer 610 may access the peer included in the peer list and request the piece included in the piece information. When the request peer 610 receives all pieces included in the piece information, the request peer 610 may perform piece reception, starting from a piece subsequent to the piece received last. In terms of streaming service, an outdated piece may be meaningless and thus, the request peer 610 may not receive a peer having a value less than that of the piece included in the piece information from another peer.

Figure 7:
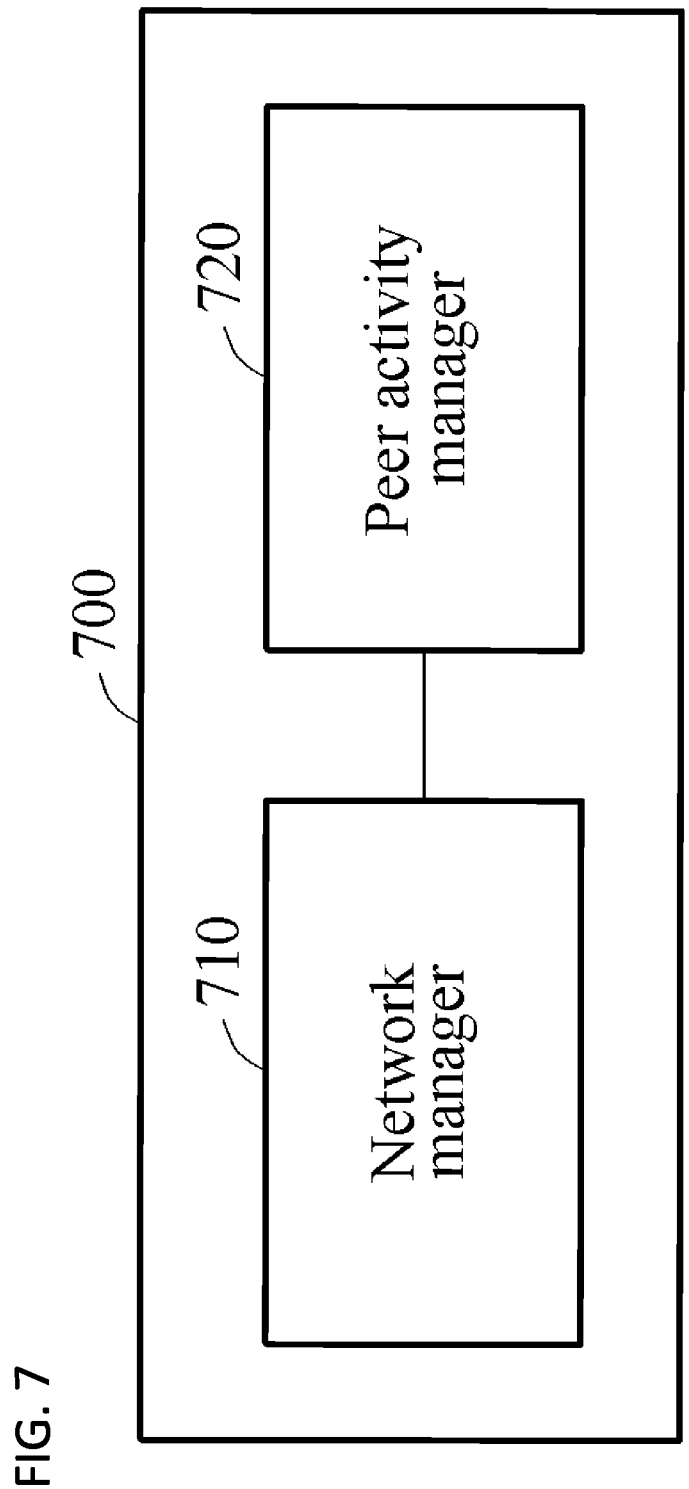
FIG. 7 is a block diagram illustrating a P2P network management system according to an example embodiment.

FIG. 7 is a block diagram illustrating a P2P network management system according to an example embodiment.

Referring to FIG. 7, a P2P network management system may include a network manager 710 and a peer activity manager 720.

The network manager 710 may manage an overlay network in which a plurality of peers participates.

The peer activity manager 720 may manage status information of the plurality of peers.

In response to a request for a peer list from a request peer, the network manager 710 may generate the peer list and send a request for piece information corresponding to the peer list to the peer activity manager 720. The peer activity manager 720 may generate the piece information based on peer status information and provide the piece information to the network manager 710. The network manager 710 may generate a response message including the piece information and the peer list and transmit the response message to the request peer.

Since the descriptions of FIGS. 1 through 6 are applicable here, repeated descriptions with respect to FIG. 7 will be omitted for brevity.

In an example embodiment, when contents are distributed as sliced fragments in an overlay network, it is possible to observe that some fragments are not distributed well over the overlay network. Consequently, many peers are trying to find the peers possessing the rare fragments. This may cause delay of completion of file download. Furthermore, OMS does not provide peers with a list containing every peers but only a subset. When a peer joins an overlay network, it starts to download sliced fragments with the peers in the peer list. FIG. 3 shows an example of fragment distribution status regarding whole peers compared to that regarding subset of peers. As shown in the FIG. 3, the distribution status of fragments can be varied according to peer list of overlay network.

In case of managed P2P communications, OMS can analyze the distribution status of fragments since PAMS has gathered fragment distribution report from peers. By using this information, it is possible to find rare fragments, and OMS let those fragments be distributed more actively. Consequently distribution performance of the overlay network can be enhanced.

A series of communications for providing rarest fragment list are performed when a peer request for the peer list of an overlay network to OMS, as below. When a peer receives peer list along with fragment information, it should request for rarest fragments which have higher priority. OMS can boost the distribution of rarest fragments to enhance overall performance. This feature can be used in emergency distribution such as urgent patch and emergency alert.

(1) Each peer sends dynamic status information report message to PAMS on fragment exchange event. PAMS can find the rarest fragments by analysing aggregated fragment distribution information.

(2) Peer requests OMS for peer list. The request is made when a peer joins the overlay network.

(3) OMS sends PAMS a subset of peer list and requests to find the rarest fragments that are possessed by the peers in the subset.

PAMS returns ID list of fragments with the distribution rate less than the predefined threshold. These fragments are assumed to be rarest fragment. The threshold value changes as with the average number of fragment distribution rate.

(4) PAMS returns the information of rarest fragments to OMS.

(5) OMS returns peer list along with fragment information.

(6) The peer connects to the peers in the peer list and exchanges buffermap.

(7) When the peer finds a peer possessing fragment(s) included in the fragment list, it requests the corresponding peer to send that fragment(s) preferably.

In an another example embodiment, overlay network for live streaming service has one or small number of sources generating new fragments. To get the latest streaming data, every peer attempts to get the lasted fragments, thus old fragments are hardly exchanged by the peers. Also, starvation problem can occur in this process. Therefore, OMS can provide a method for scattering peers based on the user's class. This makes it possible to provide differentiated service based on user's class. In Managed P2P communications, UMS maintains user information and PAMS is aware of peer in the overlay network. Procedures for providing differentiated live streaming based on user's class are performed, as below.

(1) Each peer sends PAMS dynamic status information report message to report of fragment exchanges. PAMS is aware of fragment distribution status by analysing aggregated fragment distribution information.

(2) A peer requests OMS to send peer list along with its peer identifier.

(3) OMS requests UMS for class information of the user corresponding to the peer identifier. It is assumed that UMS knows the relationship between peer identifier and user identifier.

(4) UMS returns class information.

(5) OMS requests PAMS for appropriate fragment list and peer list. In this step, OMS can provide PAMS with the subset of peers participating in the overlay network. If not, PAMS decides the appropriate subset of peers based on its own policy.

(6) PAMS returns optimized fragment list and peer list for the live streaming service.

In overlay network for streaming, the optimized lists should be made in accordance with characteristics of overlay network. Therefore, OMS needs to register each overlay network with characteristics to PAMS for this feature.

PAMS can make use of user's class, fragment distribution status, peer list, content-type (e.g., file, stream, etc.) for generating optimized fragment list.

(7) OMS responds to the requesting peer with the peer list and fragment list received from PAMS.

(8) The peer exchanges buffermap with other peers.

(9) When the peer finds a peer possessing fragments(s) included in the fragment list given by OMS, it requests that peer to send such fragment(s).

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a peer-to-peer (P2P) network management system, the method comprising:
   receiving a request for a peer list from a requesting peer;
   sending a subset of the peer list to a peer activity management server and requesting information about rarest fragments that are possessed by peers in the subset, wherein the rarest fragments correspond to fragments of which a distribution rate is less than a threshold;
   receiving the information about the rarest fragments from the peer activity management server; and
   returning the subset along with the information about the rarest fragments to the requesting peer,
   wherein the information about the rarest fragments corresponds to a fragment list including a number of the rarest fragments and identification information of each of the rarest fragments, and
   wherein the threshold changes according to an average fragment distribution rate.

2. The method of claim 1, wherein the requesting peer is configured to request a rarest fragment when the requesting peer finds a peer that possesses the rarest fragment.

3. A peer-to-peer (P2P) network management system comprising:
   a network manager configured to manage an overlay network in which a plurality of peers participates; and
   a peer activity manager configured to manage peer status information of the plurality of peers,
   wherein the network manager is further configured to:
   receive a request for a peer list from a requesting peer,
   send a subset of the peer list to a peer activity management server and request information about rarest fragments that are possessed by peers in the subset, the rarest fragments corresponding to fragments of which a distribution rate is less than a threshold,
   receive the information about the rarest fragments from the peer activity management server, and
   return the subset along with the information about the rarest fragments to the requesting peer,
   wherein the information about the rarest fragments corresponds to a fragment list including a number of the rarest fragments and identification information of each of the rarest fragments, and
   wherein the threshold changes according to an average fragment distribution rate.

4. The system of claim 3, wherein the requesting peer is configured to request a rarest fragment when the requesting peer finds a peer that possesses the rarest fragment.

* * * * *